(12) United States Patent
Minamisawa et al.

(10) Patent No.: US 11,982,865 B2
(45) Date of Patent: May 14, 2024

(54) UNIT WITH SHAKE CORRECTION FUNCTION

(71) Applicant: NIDEC SANKYO CORPORATION, Nagano (JP)

(72) Inventors: Shinji Minamisawa, Nagano (JP); Takeshi Sue, Nagano (JP)

(73) Assignee: NIDEC SANKYO CORPORATION, Nagano (JP)

(*) Notice: Subject to any disclaimer, the term of this patent is extended or adjusted under 35 U.S.C. 154(b) by 584 days.

(21) Appl. No.: 17/279,104

(22) PCT Filed: Sep. 9, 2019

(86) PCT No.: PCT/JP2019/035386
§ 371 (c)(1),
(2) Date: Mar. 24, 2021

(87) PCT Pub. No.: WO2020/066572
PCT Pub. Date: Apr. 2, 2020

(65) Prior Publication Data
US 2021/0389550 A1    Dec. 16, 2021

(30) Foreign Application Priority Data

Sep. 27, 2018 (JP) ................................. 2018-181675

(51) Int. Cl.
*G02B 27/64* (2006.01)
*G02B 7/09* (2021.01)

(52) U.S. Cl.
CPC ............ *G02B 7/09* (2013.01); *G02B 27/646* (2013.01)

(58) Field of Classification Search
None
See application file for complete search history.

(56) References Cited

U.S. PATENT DOCUMENTS 7,689,109 B2    3/2010 Noguchi
7,809,257 B2    10/2010 Jenaka
(Continued)

FOREIGN PATENT DOCUMENTS

CN    101231444    7/2008
CN    101266383    9/2008
(Continued)

OTHER PUBLICATIONS

"International Search Report (Form PCT/ISA/210) of PCT/JP2019/035386," dated Dec. 10, 2019, with English translation thereof, pp. 1-4.

(Continued)

*Primary Examiner* — Derek S. Chapel
(74) *Attorney, Agent, or Firm* — JCIPRNET

(57) ABSTRACT

In a unit with shake correction function, a driving magnet and a driving coil which constitute a rolling drive mechanism are arranged on an outer side of a radial direction with respect to a disposition space for an optical module that is provided in a movable body. Therefore, since there is no need to arrange the disposition space and the rolling drive mechanism to be deviated from each other in an optical axis direction, it is possible to make the unit with shake correction function thin in the optical axis direction. Further, in the rolling drive mechanism, since the driving magnet and the driving coil face each other in the optical axis direction, a magnetic field of the rolling drive mechanism does not easily enter the disposition space for the optical module. Consequently, magnetic interference between the movable body and the rolling drive mechanism can be suppressed.

7 Claims, 9 Drawing Sheets

(56) References Cited

U.S. PATENT DOCUMENTS

| | | | |
|---|---|---|---|
| 7,817,908 B2 | 10/2010 | Kawai | |
| 8,576,495 B2 | 11/2013 | Li et al. | |
| 8,599,273 B2 | 12/2013 | Lee | |
| 8,625,022 B2 | 1/2014 | Nakayama | |
| 8,711,497 B2 | 4/2014 | Machida et al. | |
| 8,823,811 B2 | 9/2014 | Lee | |
| 8,860,828 B2 | 10/2014 | Wade et al. | |
| 8,908,086 B2 | 12/2014 | Kawai | |
| 9,063,346 B2 | 6/2015 | Suzuka | |
| 9,977,254 B2 | 5/2018 | Kim et al. | |
| 10,503,050 B2 | 12/2019 | Minamisawa et al. | |
| 10,598,953 B2 | 3/2020 | Minamisawa et al. | |
| 2006/0082674 A1* | 4/2006 | Noji | H04N 23/687 348/360 |
| 2010/0033822 A1 | 2/2010 | Chang | |
| 2010/0188516 A1 | 7/2010 | Kaneko et al. | |
| 2014/0198387 A1 | 7/2014 | Hwang et al. | |
| 2015/0116514 A1 | 4/2015 | Kim et al. | |
| 2015/0168683 A1 | 6/2015 | Terada | |
| 2020/0292841 A1 | 9/2020 | Sakae et al. | |

FOREIGN PATENT DOCUMENTS

| | | |
|---|---|---|
| CN | 101726851 | 6/2010 |
| CN | 101840128 | 9/2010 |
| CN | 102298220 | 12/2011 |
| CN | 102736358 | 10/2012 |
| CN | 102749697 | 10/2012 |
| CN | 102934021 | 2/2013 |
| CN | 103135195 | 6/2013 |
| CN | 103185945 | 7/2013 |
| CN | 103226231 | 7/2013 |
| CN | 103926780 | 7/2014 |
| CN | 103995414 | 8/2014 |
| CN | 104020546 | 9/2014 |
| CN | 204203598 | 3/2015 |
| CN | 104570267 | 4/2015 |
| CN | 104865775 | 8/2015 |
| CN | 108073010 | 5/2018 |
| CN | 108073012 | 5/2018 |
| JP | 2009008944 | 1/2009 |
| JP | 2011113009 | 6/2011 |
| JP | 2012037593 | 2/2012 |
| JP | 2012118517 | 6/2012 |
| JP | 2017015772 | 1/2017 |
| JP | 2018077391 | 5/2018 |
| KR | 20160073763 | 6/2016 |
| WO | 2018061455 | 4/2018 |
| WO | 2019058785 | 3/2019 |

OTHER PUBLICATIONS

Office Action of China Counterpart Application, with English translation thereof, dated Sep. 15, 2021, pp. 1-18.

* cited by examiner

UNIT WITH SHAKE CORRECTION FUNCTION

CROSS-REFERENCE TO RELATED APPLICATION

This application is a 371 application of the international PCT application serial no. PCT/JP2019/035386, filed on Sep. 9, 2019, which claims the priority benefits of Japan application no. 2018-181675 filed on Sep. 27, 2018. The entirety of each of the above-mentioned patent applications is hereby incorporated by reference herein and made a part of this specification.

TECHNICAL FIELD

The present invention relates to a unit with shake correction function in which an optical module is mounted.

BACKGROUND ART

An imaging apparatus, which is to be mounted on a moving body such as a portable terminal, a vehicle, or an unmanned helicopter, is required to suppress disturbance in a captured image caused by a shake of the imaging apparatus. In light of the above, it has been proposed to mount an optical module for image capturing in a unit with shake correction function. The unit with shake correction function is provided with a movable body on which an optical module is mounted, a fixed body which supports the movable body such that the movable body can be displaced via a support mechanism, and a drive mechanism for shake correction which corrects the shake of the movable body with respect to the fixed body. For the drive mechanism for shake correction, a drive mechanism for swinging which swings the optical module in a pitching (vertical shake: tilting) direction and a yawing (horizontal shake: panning) direction, and a rolling drive mechanism which rotates the optical module about an optical axis, for example, are used.

Patent Literature 1 discloses a lens driving apparatus including a first drive mechanism which moves an image capturing lens in an optical axis direction, and a second drive mechanism and a third drive mechanism which correct a shake of the image capturing lens. The lens driving apparatus of Patent Literature 1 is provided with a first holding body which holds a lens holder, a second holding body which supports the first holding body so as to be movable in the optical axis direction via a plate spring, and a fixed body which holds the second holding body so as to be movable in a direction substantially orthogonal to the optical axis direction via a wire. The first drive mechanism is constituted from a magnet and a coil which are arranged between the first holding body and the second holding body. Further, the second drive mechanism and the third drive mechanism, which are the drive mechanisms for shake correction, are constituted from a magnet and a coil arranged between the second holding body and the fixed body.

CITATION LIST

Patent Literature

[Patent Literature 1] Japanese Patent Laid-Open No. 2011-113009

SUMMARY OF THE INVENTION

Technical Problems

In the lens driving apparatus of Patent Literature 1, the fixed body is an exterior case of the apparatus, the second holding body is an inner case arranged on the inner side of the exterior case, and the first drive mechanism is arranged on the inner side of the second holding body. The first drive mechanism is constituted from the coil held by the first holding body which moves in the optical axis direction integrally with the image capturing lens, and the magnet held by the second holding body. The second holding body which holds the magnet is formed of a magnetic material, and serves as a yoke for the magnet.

As in Patent Literature 1, in a case where a movable body includes a magnetic drive mechanism (a magnet and a coil) therein, and a magnetic drive mechanism (a magnet and a coil) is also arranged on the outer side of the movable body, magnetic interference between the magnetic drive mechanism on the inner side of the movable body and the magnetic drive mechanism on the outer side of the movable body causes a problem. For example, in a case where the magnetic drive mechanism on the inner side of the movable body employs a scheme (moving magnet scheme) in which the magnet is mounted on the movable part side (lens holder side), instead of a scheme (moving coil scheme) in which the coil is mounted on the movable part side (lens holder side) as in Patent Literature 1, the coil, not the magnet, is arranged on the second holding body. Therefore, it is not necessary to impart the function of a yoke to the inner case, and a non-magnetic member is used for the second holding body. Therefore, since the magnetic field of the outer magnetic drive mechanism cannot be shielded by the inner case made of the magnetic material, the magnet inside the movable body is attracted by the outer magnetic drive mechanism and becomes immobile.

Also, even if the movable body does not include a magnetic drive mechanism therein, in a case where a component which can be affected by the magnetic field is incorporated, an influence of the magnetic field to be generated by a shake correction drive mechanism on the movable body similarly causes a problem.

In view of the above problems, an object of the present invention is to propose a unit with shake correction function whereby magnetic interference between a magnetic drive mechanism for shake correction, which is provided between a movable body and a fixed body, and the movable body can be suppressed.

Means for Solving the Problem

In order to achieve the above object, the present invention includes: a movable body provided with a disposition space for an optical module; a fixed body; a rolling support mechanism which supports the movable body to be rotatable about an optical axis of the optical module relative to the fixed body; and a rolling drive mechanism which revolves the movable body about the optical axis, and is characterized in that the rolling drive mechanism is provided with a driving coil mounted on one of the movable body and the fixed body, and a driving magnet mounted on the other, and that the driving coil and the driving magnet face each other in the optical axis direction, and are arranged on the outer side of a radial direction with the optical axis at the center relative to the disposition space.

In the present invention, the movable body capable of holding the optical module can be rotated about the optical axis. Thus, since shake correction in a rolling direction can be performed, disturbance in an image captured by the optical module can be suppressed. Also, since the rolling drive mechanism is arranged on the outer side of the radial direction relative to the disposition space for the optical module, there is no need to arrange the disposition space for the optical module and the rolling drive mechanism to be deviated from each other in the optical axis direction. Therefore, it is possible to suppress an increase in size in the optical axis direction resulting from providing the rolling drive mechanism. Accordingly, it is possible to make the unit with shake correction function thin in the optical axis direction. Further, in the rolling drive mechanism, since the driving magnet and the driving coil face each other in the optical axis direction, a magnetic field of the rolling drive mechanism does not easily enter the disposition space for the optical module. Therefore, magnetic interference between the movable body and the rolling drive mechanism can be suppressed.

In the present invention, preferably, the rolling drive mechanism should overlap the movable body when viewed from the radial direction. Further, preferably, the rolling support mechanism should overlap the movable body and the rolling drive mechanism when viewed from the radial direction. By structuring as above, it is possible to suppress an increase in size in the optical axis direction resulting from providing the rolling drive mechanism, and an increase in size in the optical axis direction resulting from providing the rolling support mechanism. Consequently, it is possible to make the unit with shake correction function thin in the optical axis direction.

In the present invention, preferably, the optical module should be provided with a magnet and a coil, and the center of the magnet in the optical axis direction and the center of the driving magnet in the optical axis direction should overlap one another when viewed from the radial direction. By structuring as above, the direction of a magnetic flux emitted from the driving magnet becomes that which is orthogonal to a direction from the driving magnet toward the magnet within the optical module. Accordingly, since the magnetic flux emitted from the driving magnet is less likely to reach the magnet within the optical module, magnetic interference between the rolling drive mechanism and the optical module can be suppressed.

In the present invention, preferably, the movable body should be provided with a rolling drive mechanism fixation part to which the driving magnet or the driving coil is arranged, and the rolling drive mechanism fixation part should include a movable-body-side stopper portion which makes abutment with a fixed-body-side stopper portion provided on the fixed body in a direction about the optical axis. By structuring as above, it is possible to prevent the number of components from increasing due to a stopper member provided separately from the rolling drive mechanism fixation part, and the structure of the movable body can be simplified.

In the present invention, preferably, the driving coil should be arranged on the fixed body, and the driving magnet should be arranged on the movable body. By structuring as above, there is no need to provide a wiring member for supplying power to the driving coil on the movable body. Therefore, a space for allowing the wiring member to move does not need to be secured, and wiring is facilitated. Also, since a stress is not applied to the wiring member during operation of the movable body, it is possible to prevent a decrease in the accuracy of shake correction due to the stress, and the rolling correction can be performed with high accuracy. Moreover, no control or electric power is required to prevent the decrease in the accuracy of the shake correction.

In the present invention, preferably, the rolling drive mechanism should be arranged at a plurality of locations including two places on the opposite sides with the optical axis being interposed therebetween. By structuring as above, as compared to a case where the rolling drive mechanism is provided at only one place, it is possible to prevent the center of gravity of the movable body from deviating. Consequently, it is possible to suppress a decrease in the accuracy of the shake correction caused by the deviation of the center of gravity, and the rolling correction can be performed with high accuracy. Also, there is no need to provide a counterweight for suppressing the deviation of the center of gravity. Further, by virtue of providing multiple rolling drive mechanisms, it is possible to perform the shake correction at a large torque.

In the present invention, preferably, the rolling support mechanism should be provided at a plurality of locations in a circumferential direction with the optical axis at the center; the plurality of locations should include locations facing each other in a first direction orthogonal to the optical axis direction, and locations facing each other in a second direction orthogonal to the optical axis direction and the first direction; an interval between the rolling support mechanisms which face each other in the first direction should be smaller than an interval between the rolling support mechanisms which face each other in the second direction; and the rolling drive mechanism should be provided at locations facing each other in the second direction with the optical axis being interposed therebetween. By structuring as above, the size in the first direction is not increased by the providing of the rolling drive mechanisms. Consequently, the size of the unit with shake correction function can be reduced in the first direction orthogonal to the direction in which the rolling drive mechanisms face each other.

In the present invention, preferably, the fixed body should include: a fixed frame, which is provided with a wiring recessed part recessed in the optical axis direction; and a flexible printed circuit board connected to the driving coil, and the wiring recessed part should be shaped such that a distance between a Hall element, which is mounted on the flexible printed circuit board arranged in the wiring recessed part, and the driving magnet is set to a predetermined distance. By structuring as above, it is possible to prevent the flexible printed circuit board from protruding from the fixed frame in the optical axis direction. Consequently, it is possible to make the unit with shake correction function thin in the optical axis direction. Further, since the Hall element can be positioned by arranging the flexible printed circuit board in the wiring recessed part, positioning of the Hall element is facilitated.

Effect of the Invention

In the present invention, since the rolling drive mechanism is arranged on the outer side of the radial direction relative to the disposition space for the optical module, there is no need to arrange the disposition space for the optical module and the rolling drive mechanism to be deviated from each other in the optical axis direction. Therefore, it is possible to suppress an increase in size in the optical axis direction resulting from providing the rolling drive mechanism. Accordingly, it is possible to make the unit with shake correction function thin in the optical axis direction. Moreover, in the rolling drive mechanism, since the magnet and the coil face each other in the optical axis direction, a magnetic field of the rolling drive mechanism does not easily enter the disposition space for the optical module. Therefore, magnetic interference between the movable body and the rolling drive mechanism can be suppressed.

MODE FOR CARRYING OUT THE INVENTION

In the following, an embodiment of a unit with shake correction function to which the present invention is applied will be described with reference to the drawings. In the present specification, three directions orthogonal to each other are referred to as X-axis direction, Y-axis direction, and Z-axis direction, respectively. The X-axis direction corresponds to a first direction, and one side of the X-axis direction is referred to as +X direction and the other side is referred to as −X direction. Further, the Y-axis direction corresponds to a second direction, and one side of the Y-axis direction is referred to as +Y direction and the other side is referred to as −Y direction. The Z-axis direction corresponds to a direction along an optical axis L (lens optical axis) of an optical module 1, and one side of the Z-axis direction is referred to as +Z direction and the other side is referred to as −Z direction. The +Z direction corresponds to a subject side L1, and the −Z direction corresponds to an image side L2.

Overall Configuration

Figure 1:
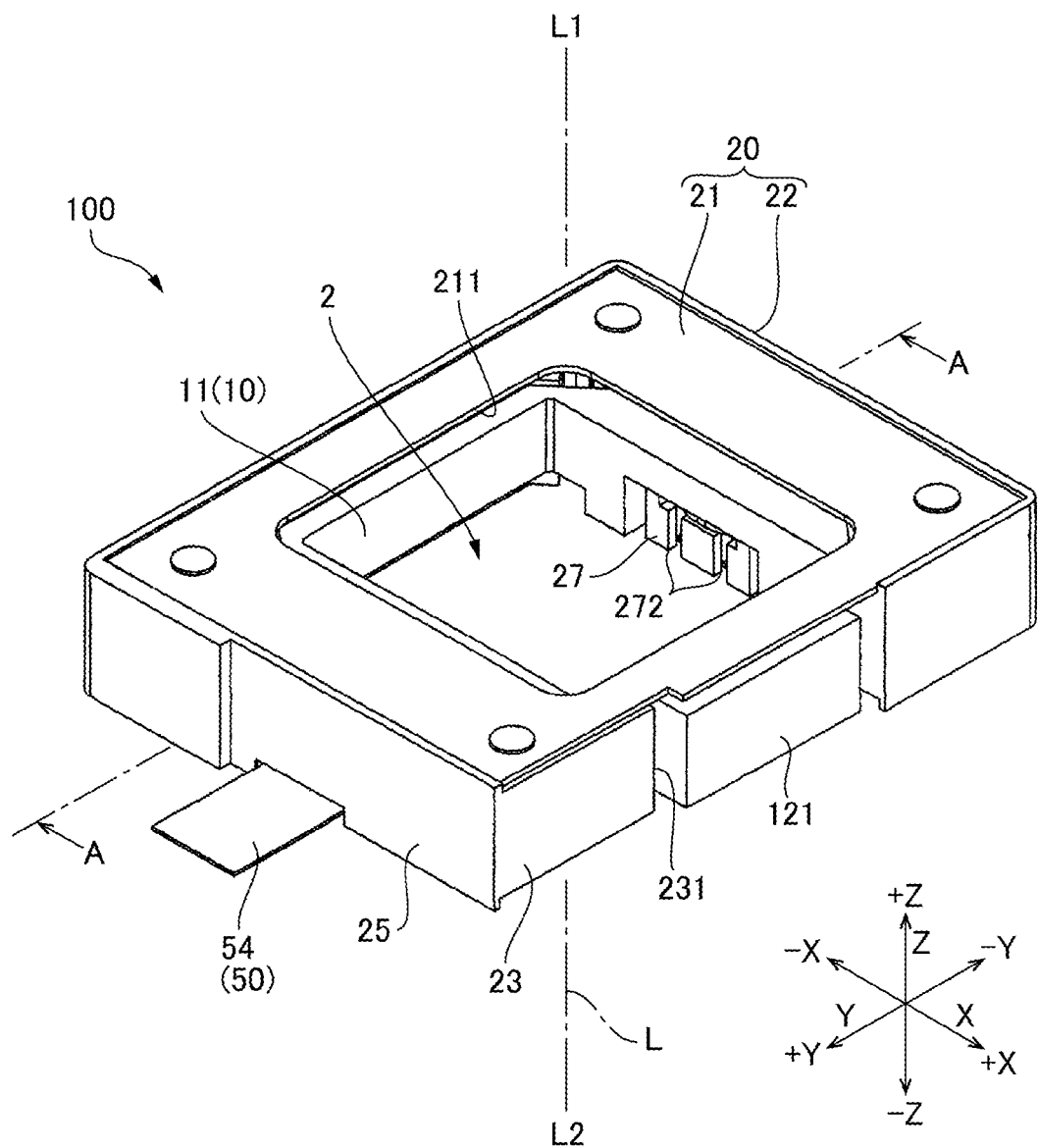
FIG. 1 is a perspective view of a unit with shake correction function to which the present invention is applied.
Figure 2:
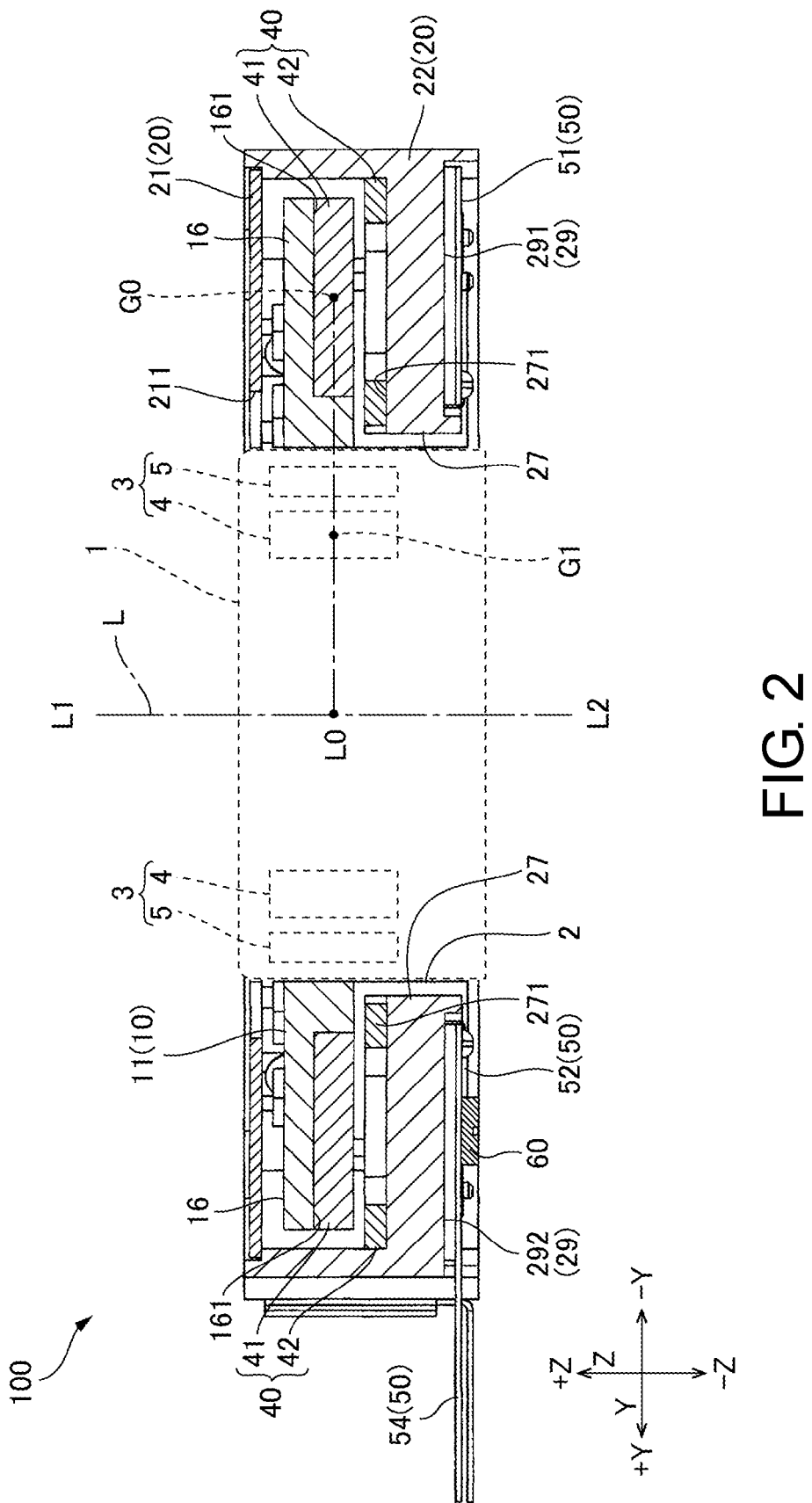
FIG. 2 is a cross-sectional view (A-A cross-sectional view of FIG. 1) of an optical module and the unit with shake correction function.

FIG. 1 is a perspective view of a unit 100 with shake correction function to which the present invention is applied. FIG. 2 is a cross-sectional view (A-A cross-sectional view of FIG. 1) of the optical module 1 and the unit 100 with shake correction function. The unit 100 with shake correction function is provided with a fixed body 20 and a movable body 10. The movable body 10 includes a disposition space 2 in which the optical module 1 is arranged. As shown in FIG. 1, the unit 100 with shake correction function is of a rectangular parallelepiped shape. The disposition space 2 is rectangular when viewed from an optical axis L direction, and is a penetrating portion which penetrates, in the Z-axis direction, substantially the center of the unit 100 with shake correction function in the X-axis direction and the Y-axis direction. Note that the shape of the disposition space 2 need not be rectangular, and can be changed as appropriate according to the shape of the optical module 1.

As shown in FIG. 2, the optical module 1 is disposed in the disposition space 2, and is held by the movable body 10. The movable body 10 is connected to the fixed body 20 via a rolling support mechanism 30, which will be described later. The rolling support mechanism 30 supports the movable body 10 to be rotatable about the optical axis L of the optical module 1 relative to the fixed body 20. Also, the unit 100 with shake correction function is provided with a rolling drive mechanism 40 which rotates the movable body 10 about the optical axis L.

The unit 100 with shake correction function which holds the optical module 1 is mounted on an optical instrument such as an imaging apparatus to be mounted on a portable terminal, a drive recorder, or an unmanned helicopter. Of the shakes of the optical module 1 that occur when the optical instrument is subjected to shakes at the time of image capturing, a rotation about the X-axis corresponds to pitching (vertical shake), a rotation about the Y-axis corresponds to yawing (horizontal shake), and a rotation about the Z-axis corresponds to rolling. When the unit 100 with shake correction function detects a shake about the Z-axis by a gyroscope, the unit drives the rolling drive mechanism 40 to perform shake correction. A control unit which controls the rolling drive mechanism, and the gyroscope may be mounted on the optical instrument main body, or may be mounted on the optical module 1.

As shown in FIG. 2, in the present embodiment, the optical module 1 is provided with a shake correction drive mechanism 3 which performs shake correction in the pitching direction and the yawing direction. The optical module 1 includes, for example, a fixation part which is fixed to the movable body 10, a movable part provided with a lens holder, and a support mechanism which supports the movable part to be movable in the pitching direction and the yawing direction relative to the fixation part. The shake correction drive mechanism 3 is, for example, a magnetic drive mechanism constituted from a magnet 4 and a coil 5, and rotates the movable part about the X-axis and the Y-axis relative to the fixation part. When a shake about the X-axis and a shake about the Y-axis are detected by the gyroscope or the like, the optical module 1 drives the shake correction drive mechanism 3 to perform the shake correction.

In the present embodiment, the optical module 1 is configured to include the shake correction drive mechanism 3 which performs the shake correction in the pitching direction and the yawing direction. However, the optical module 1 is not limited to the above configuration. For example, the optical module 1 may be configured to be capable of performing the shake correction in only one of the pitching direction and the yawing direction. Alternatively, the optical module 1 may be configured not to perform the correction in the pitching direction and the yawing direction, but to have an autofocus function.

Movable Body

Figure 3:
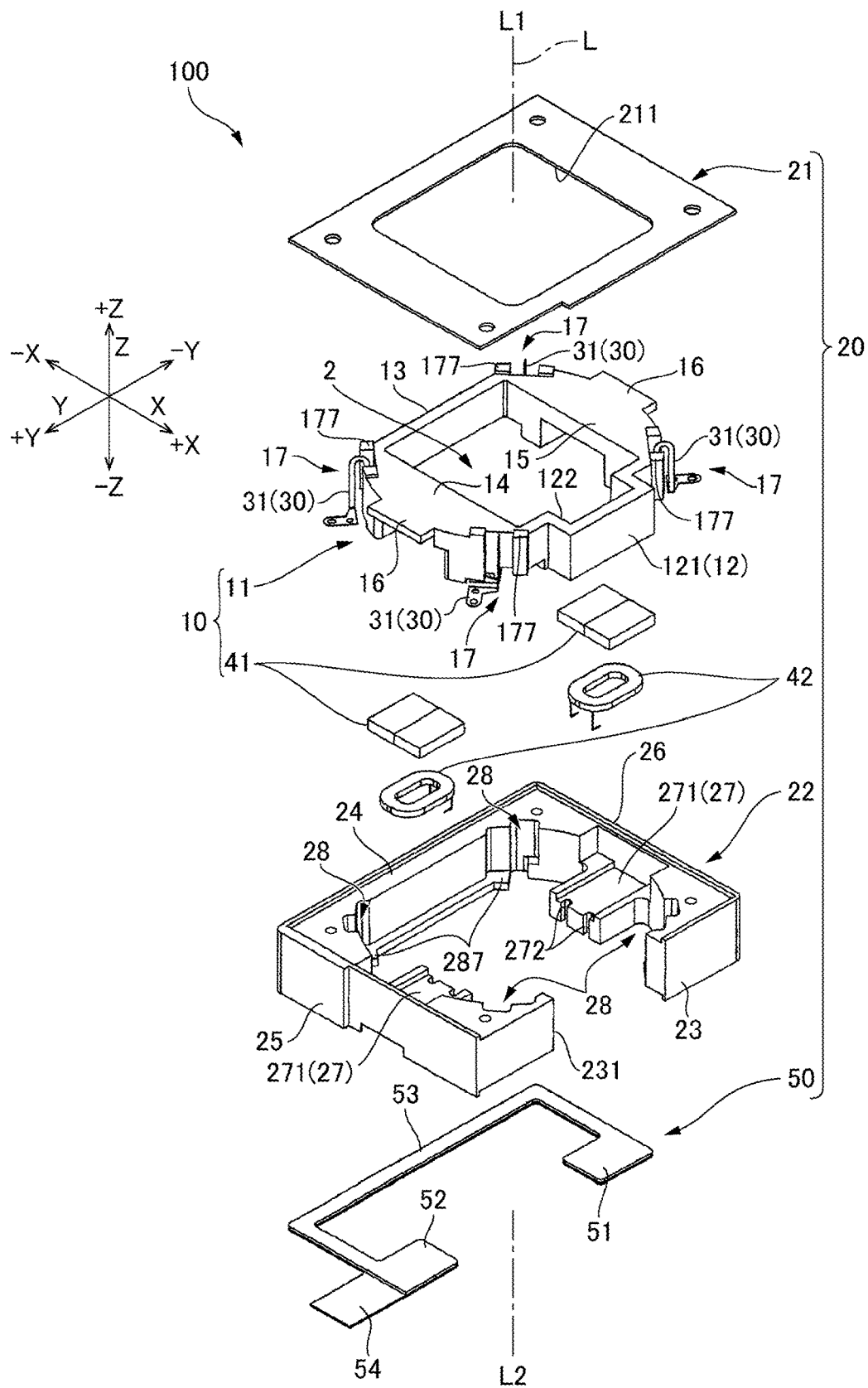
FIG. 3 is an exploded perspective view of the unit with shake correction function of FIG. 1 as viewed from a subject side.
Figure 4:
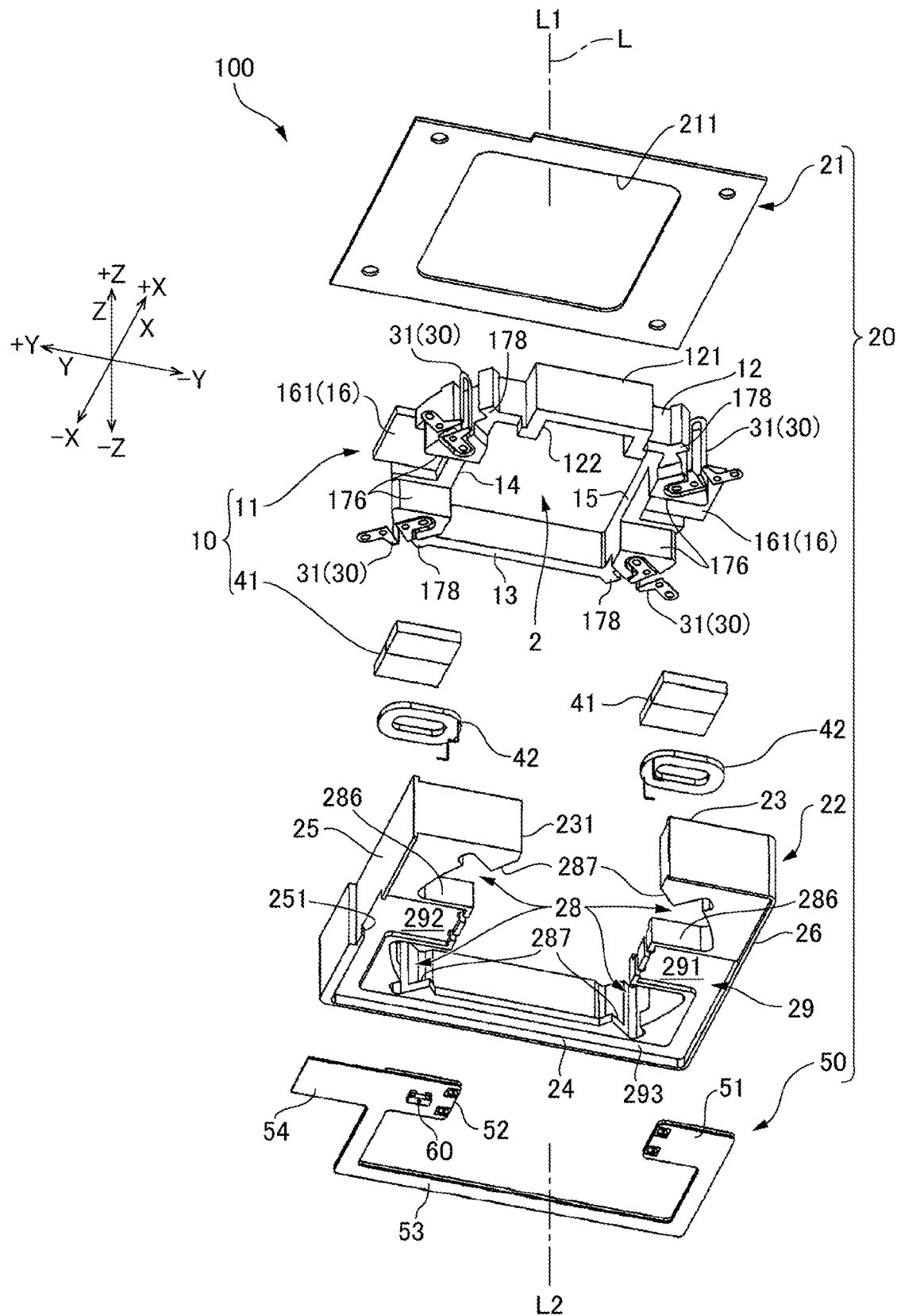
FIG. 4 is an exploded perspective view of the unit with shake correction function of FIG. 1 as viewed from an image side.

FIG. 3 is an exploded perspective view of the unit 100 with shake correction function of FIG. 1 as viewed from the subject side L1. Further, FIG. 4 is an exploded perspective view of the unit 100 with shake correction function of FIG. 1 as viewed from the image side L2. The movable body 10 is provided with a movable frame 11, and a driving magnet 41 fixed to the movable frame 11. The movable frame 11 is a frame-shaped member which surrounds the disposition space 2. The movable frame 11 includes a first frame part 12 which surrounds the +X direction side of the disposition space 2, a second frame part 13 which surrounds the −X direction side of the disposition space 2, a third frame part 14 which surrounds the +Y direction side of the disposition space 2, and a fourth frame part 15 which surrounds the −Y direction side of the disposition space 2. The third frame part 14 and the fourth frame part 15 each include a rolling drive mechanism fixation part 16 to which the driving magnet 41 is fixed. The rolling drive mechanism fixation parts 16 are provided at two places where they face each other with the optical axis L being interposed therebetween.

As shown in FIG. 4, the rolling drive mechanism fixation part 16 is a protruding portion protruding from substantially the center of each of the third frame part 14 and the fourth frame part 15 in the X direction to a side opposite to the optical axis L. A recessed part for arranging the driving magnet 41 is provided on a surface of the protruding portion on the image side L2, and a bottom surface of the recessed part serves as a magnet fixing surface 161. Also, as will be described later, the rolling drive mechanism fixation part 16 is provided with a movable-body-side stopper portion (i.e., a second restricted portion 176) for restricting a rotation of the movable body 10 relative to the fixed body 20.

At four corners of the movable frame 11, a rolling support mechanism fixation part 17 is provided. As will be described later, an elastic member 31 which constitutes the rolling support mechanism 30 is connected to the rolling support mechanism fixation part 17. The rolling support mechanism fixation parts 17 are provided on the +Y direction side of the disposition space 2 at two places where they face each other in the X-axis direction (the first direction) with the rolling drive mechanism fixation part 16 being interposed therebetween, and on the −Y direction side of the disposition space 2 at two places where they face each other in the X-axis direction (the first direction) with the rolling drive mechanism fixation part 16 being interposed therebetween.

In the movable frame 11, a width in the Y direction of the third frame part 14 and the fourth frame part 15 which are each provided with the rolling drive mechanism fixation part 16 is greater than a width in the X direction of the first frame part 12 and the second frame part 13. Therefore, the movable frame 11 has a horizontally long shape in which the dimension in the Y direction is greater than the dimension in the X direction as a whole. While the second frame part 13 extends linearly, the first frame part 12 is provided with a rectangular protruding part 121 protruding in the +X direction at a portion excluding both ends in the Y-axis direction. A recessed part 122 continuous with the disposition space 2 is provided on an inner peripheral side of the protruding part 121.

Fixed Body

The fixed body 20 is provided with a front plate 21, a fixed frame 22, a driving coil 42 to be fixed to the fixed frame 22, and a flexible printed circuit board 50. The fixed frame 22 is a frame-shaped member which surrounds the movable frame 11, and an external form thereof when viewed from the optical axis L direction has the shape of a rectangle that is long in the Y-axis direction. The front plate 21 has the shape of a rectangle that is one size smaller than the fixed frame 22, and is fixed to an end surface of the fixed frame 22 on the subject side L1 with screws. In the front plate 21, a rectangular opening portion 211 which overlaps with the disposition space 2 when viewed from the optical axis L direction is formed. As will be described later, in a state where the movable frame 11 is arranged inside the fixed frame 22, the front plate 21 functions as a member which restricts a displacement of the movable frame 11 in the optical axis L direction.

As shown in FIGS. 3 and 4, the fixed frame 22 includes a first fixed frame part 23 which surrounds the +X direction side of the movable frame 11, and at the center of the first fixed frame part 23 in the Y direction, a cutout 231 in which the protruding part 121 of the movable frame 11 is to be arranged is provided. Also, the fixed frame 22 includes a second fixed frame part 24 which surrounds the −X direction side of the movable frame 11, a third fixed frame part 25 which surrounds the +Y direction side of the movable frame 11, and a fourth fixed frame part 26 which surrounds the −Y direction side of the movable frame 11. The third fixed frame part 25, the second fixed frame part 24, and the fourth fixed frame part 26 surround three sides of the movable frame 11.

The third fixed frame part 25 and the fourth fixed frame part 26 which face each other in the Y-axis direction each include a coil fixation part 27 to which the driving coil 42 is fixed. The coil fixation parts 27 are provided at two places where they face each other with the optical axis L being interposed therebetween. The coil fixation part 27 is provided at a position overlapping the rolling drive mechanism fixation part 16, which is provided on the movable frame 11, when viewed from the optical axis L direction. The coil fixation parts 27 are rectangular protruding portions protruding respectively from the centers of the third fixed frame part 25 and the fourth fixed frame part 26 in the X-axis direction toward the side of the optical axis L. A recessed part for arranging the driving coil 42 is formed on a surface of the protruding portion on the subject side L1, and a bottom surface of the recessed part serves as a coil fixing surface 271. A recessed groove 272 for arranging a coil wire drawn from the driving coil 42 is provided on an end surface of the coil fixation part 27 on the optical axis L side. Also, as will be described later, the coil fixation part 27 is provided with a fixed-body-side stopper portion (i.e., a second restricting portion 286) for restricting a rotation of the movable body 10 relative to the fixed body 20.

At four corners of the fixed frame 22, a rolling support mechanism arrangement part 28 is provided. In the rolling support mechanism arrangement parts 28 at the four places, the rolling support mechanism fixation parts 17 of the movable body 10 are arranged, respectively. As will be described later, the elastic member 31 which constitutes the rolling support mechanism 30 is connected to the rolling support mechanism arrangement part 28. The rolling support mechanism arrangement parts 28 are provided at two places where they face each other in the X-axis direction (the first direction) with the coil fixation part 27 on the +Y direction side being interposed therebetween, and at two places where they face each other in the X-axis direction (the first direction) with the coil fixation part 27 on the −Y direction side being interposed therebetween.

As shown in FIG. 4, on a surface of the fixed frame 22 on the image side L2, a wiring recessed part 29 which is recessed toward the subject side L1 in the optical axis L direction is formed. The wiring recessed part 29 is recessed in a shape of allowing the flexible printed circuit board 50 to be arranged therein. As shown in FIGS. 3 and 4, the flexible printed circuit board 50 includes: a first rectangular portion 51 and a second rectangular portion 52 which are provided with lands to which the coil wires of the driving coils 42 are connected; a connecting portion 53 connecting the first rectangular portion 51 and the second rectangular portion 52; and a draw-out portion 54 which is drawn out from the fixed frame 22 in the +Y direction. The flexible printed circuit board 50 is configured by fixing a stiffener plate to a flexible substrate. The stiffener plate is provided at a region excluding the draw-out portion 54, and the draw-out portion 54 includes only the flexible substrate.

The connecting portion 53 extends from the first rectangular portion 51 in the −X direction and bends in the +Y direction, extends linearly in the Y-axis direction and bends in the +X direction, and is connected to the second rectangular portion 52. The draw-out portion 54 extends in the +Y direction through a cutout 251 formed on an outer peripheral edge of the third fixed frame part 25. Of the first rectangular portion 51 and the second rectangular portion 52, a Hall element 60 is mounted on the second rectangular portion 52 which is located closer to the draw-out portion 54.

The wiring recessed part 29 includes a first recessed part 291 in which the first rectangular portion 51 is arranged, a second recessed part 292 in which the second rectangular portion 52 is arranged, and a third recessed part 293 in which the connecting portion 53 is arranged. The first rectangular portion 51 is formed on a surface on the image side L2 of the rolling drive mechanism fixation part 16 provided at the fourth fixed frame part 26. Also, the second rectangular portion 52 is formed on a surface on the image side L2 of the rolling drive mechanism fixation part 16 provided at the third fixed frame part 25. The first rectangular portion 51 and the second rectangular portion 52 are connected to the recessed grooves 272, and the coil wires can be routed from the coil fixation parts 27 via the recessed grooves 272.

By arranging the second rectangular portion 52 of the flexible printed circuit board 50 in the second recessed part 292, the wiring recessed part 29 is formed in a such a shape that a distance between the Hall element 60 mounted on the second rectangular portion 52 and the driving magnet 41 mounted on the movable body 10 in the optical axis L direction is set to a predetermined distance. Further, a depth of the wiring recessed part 29 in the optical axis L direction is greater than a total value of the thicknesses of the second rectangular portion 52 of the flexible printed circuit board 50 and the Hall element 60 in the optical axis L direction.

Rolling Drive Mechanism

The rolling drive mechanisms 40 are provided at two places, i.e., on the +Y direction side of the disposition space 2 and on the −Y direction side of the disposition space 2, respectively, to face each other with the optical axis L being interposed therebetween, so that they are provided at a plurality of locations in a circumferential direction with the optical axis L at the center. Each of the rolling drive mechanisms 40 is provided with the driving magnet 41 and the driving coil 42. In the present embodiment, the driving magnet 41 is arranged on the movable body 10, and the driving coil 42 is arranged on the fixed body 20. As shown in FIG. 2, when the movable frame 11 is arranged inside the fixed frame 22, the driving magnet 41 fixed to the rolling drive mechanism fixation part 16 of the movable frame 11 and the driving coil 42 fixed to the coil fixation part 27 of the fixed frame 22 face each other in the optical axis L direction. In the present embodiment, in each of the two sets of the rolling drive mechanisms 40, the driving magnet 41 and the driving coil 42 face each other in the optical axis L direction, and are arranged on the outer side of a radial direction relative to the disposition space 2 with the optical axis L at the center.

In the present embodiment, both of the two sets of the rolling drive mechanisms 40 overlap the movable body 10 when viewed from the radial direction. That is, the driving magnet 41 is held at a position overlapping the movable frame 11 when viewed from the radial direction. Also, the driving coil 42 mounted on the fixed body 20 is arranged at a position overlapping the movable frame 11 when viewed from the radial direction. Therefore, the rolling drive mechanism 40 is arranged within the range of the height of the movable frame 11 in the optical axis L direction. Further, both of the two sets of the rolling drive mechanisms 40 overlap the rolling support mechanism 30 when viewed from the radial direction. As will be described later, the rolling support mechanism 30 is provided with the elastic member 31 which connects the movable frame 11 and the fixed frame 22, and the rolling drive mechanism 40 overlaps the elastic member 31 when viewed from the radial direction.

As shown in FIGS. 3 and 4, the driving magnet 41 is divided into two sections in the X-axis direction, and is magnetized such that magnetic poles on the image side L2 facing the driving coil 42 become different from each other by a magnetization-polarized line extending in the Y-axis direction as a boundary. The driving coil 42 is an oval air-core coil that is long in the Y-axis direction, and two long side portions on the +X direction side and the −X direction side are used as effective sides. Alternatively, as the driving coil 42, a pattern substrate (a coil substrate) formed by incorporating a coil into substrate wiring as a pattern may be used instead of the air-core coil.

One of the driving magnets 41 of the two sets of the rolling drive mechanisms 40 is arranged at a position of overlapping the Hall element 60 mounted on the flexible printed circuit board 50 when viewed from the optical axis L direction. In the present embodiment, the driving magnet 41 arranged on the +Y direction side with respect to the optical axis L and the Hall element 60 overlap one another when viewed from the optical axis L direction. When a shake about the optical axis L occurs in an optical instrument equipped with the unit 100 with shake correction function, the Hall element 60 detects a change in magnetic flux density caused by the driving magnet 41, and a shake about the optical axis L of the optical module 1 and the movable body 10 is detected on the basis of an output of the Hall element 60. On the basis of a detection result of the shake, the rolling drive mechanism 40 is driven so as to correct the shake. That is, a current is passed through the driving coils 42 of the two sets of the rolling drive mechanisms 40 so as to move the movable body 10 in the direction of canceling the shake of the optical module 1 and the movable body 10, and the shake about the optical axis L is thus corrected.

As shown in FIG. 2, in the present embodiment, the optical module 1 includes therein the shake correction drive mechanism 3 constituted from the magnet 4 and the coil 5. Here, a center G0 of the driving magnet 41 in the optical axis L direction and a center G1 of the magnet 4 within the optical module 1 in the optical axis L direction are both L0 in terms of the position in the optical axis L direction. That is, the driving magnet 41 and the magnet 4 are arranged such that the center G0 of the driving magnet 41 in the optical axis L direction and the center G1 of the magnet 4 in the optical axis L direction overlap one another when viewed from the radial direction.

Rolling Support Mechanism

Figure 5:
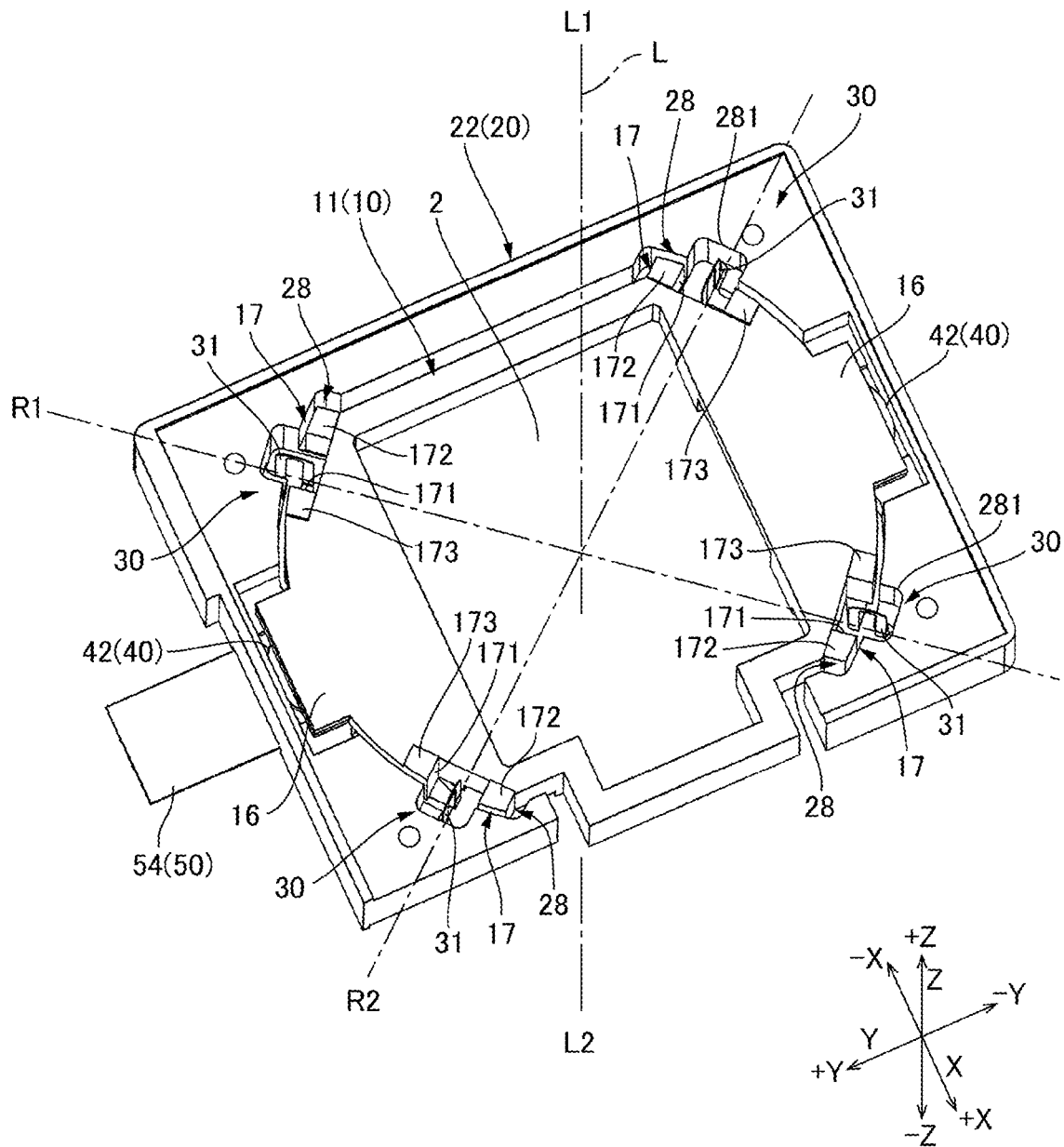
FIG. 5 is a perspective view of the unit with shake correction function from which a front plate is removed as viewed from the subject side.
Figure 6:
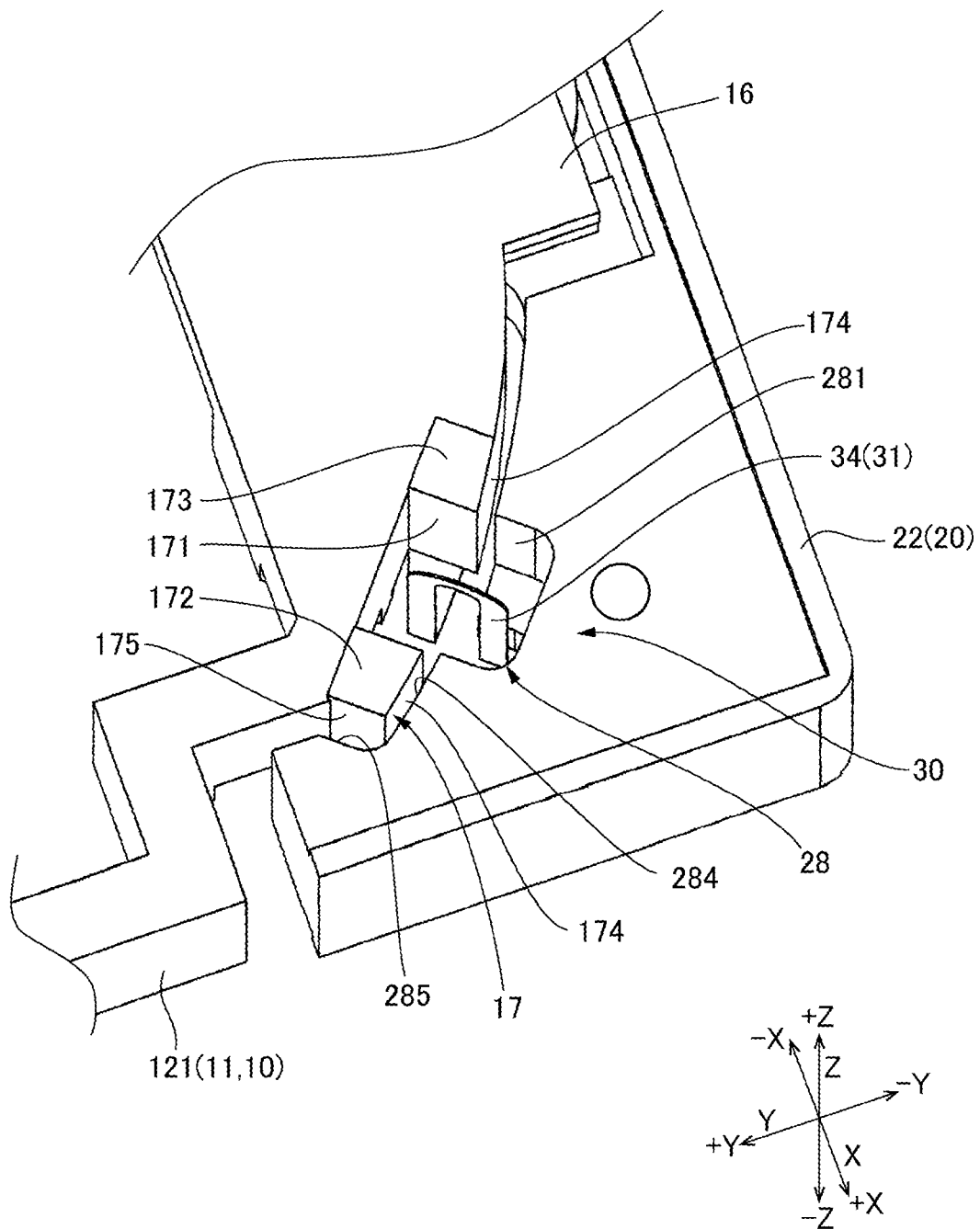
FIG. 6 is a partially enlarged view (partially enlarged view of FIG. 5) of a rolling support mechanism as viewed from the subject side.
Figure 7:
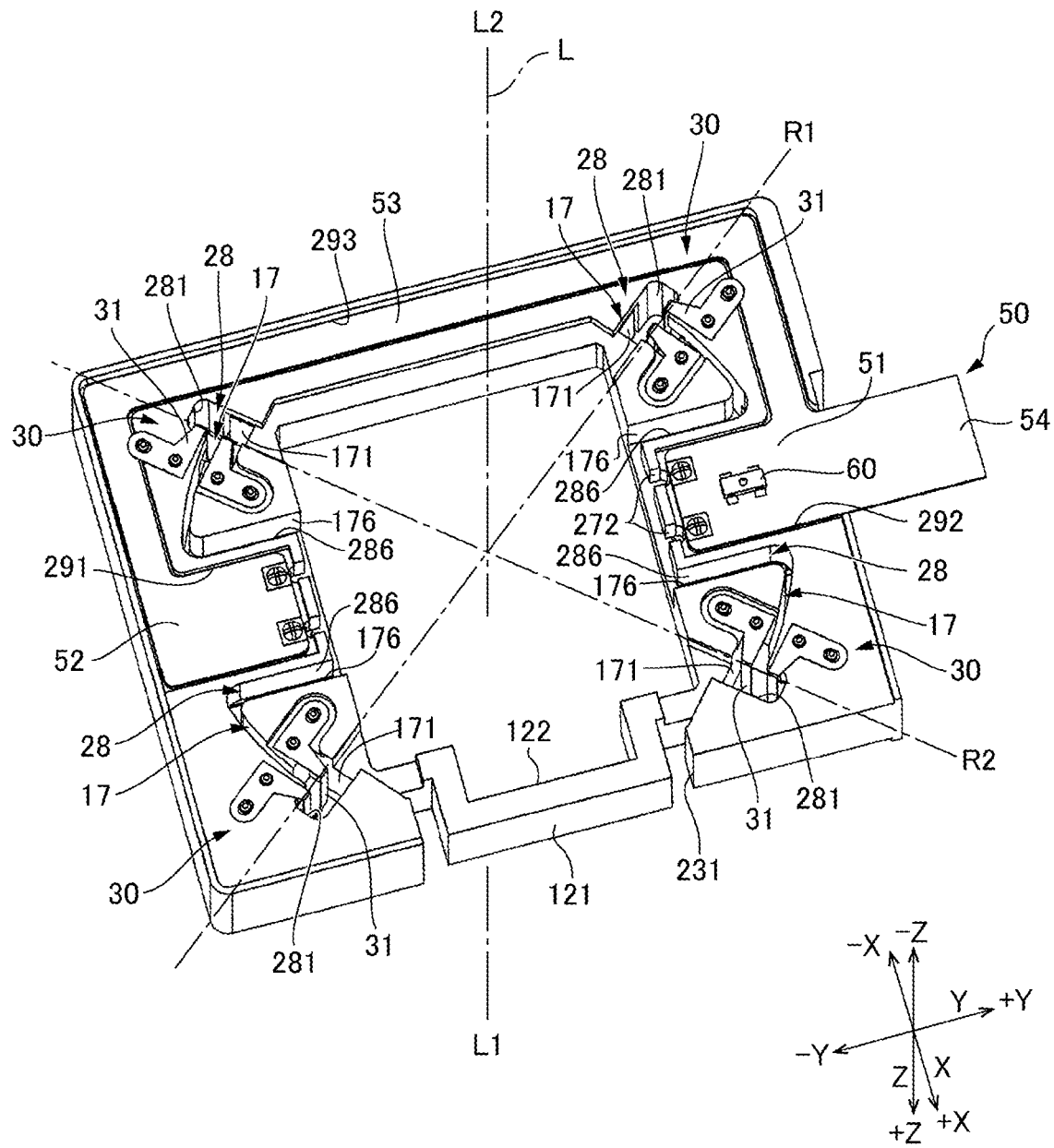
FIG. 7 is a perspective view of the unit with shake correction function from which the front plate is removed as viewed from the image side.
Figure 8:
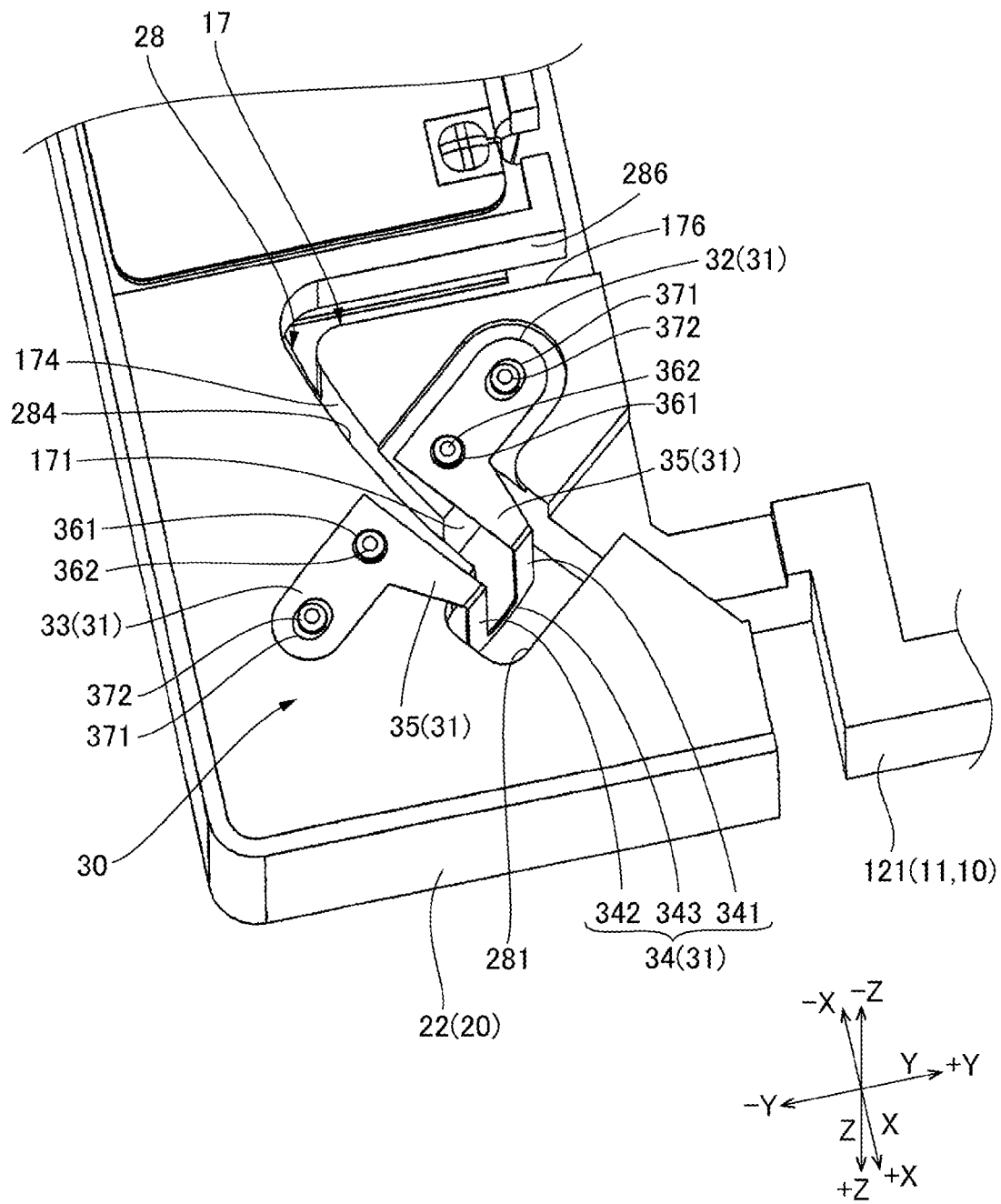
FIG. 8 is a partially enlarged view (partially enlarged view of FIG. 7) of the rolling support mechanism as viewed from the image side.

FIG. 5 is a perspective view of the unit 100 with shake correction function from which the front plate 21 is removed as viewed from the subject side L1, and FIG. 6 is a partially enlarged view (partially enlarged view of FIG. 5) of the rolling support mechanism 30 as viewed from the subject side L1. Further, FIG. 7 is a perspective view of the unit 100 with shake correction function from which the front plate 21 is removed as viewed from the image side L2, and FIG. 8 is a partially enlarged view (partially enlarged view of FIG. 7) of the rolling support mechanism 30 as viewed from the image side L2. As shown in FIGS. 5 and 7, the rolling support mechanism 30 is provided at a plurality of locations around the optical axis L. In the present embodiment, the rolling support mechanisms 30 are provided at two places on a first axis R1 which is orthogonal to the optical axis L and is inclined at a predetermined angle with respect to the X-axis direction and the Y-axis direction, and two places on a second axis R2 which is orthogonal to the optical axis L and intersects the first axis R1.

Each of the rolling support mechanisms 30 includes: the rolling support mechanism fixation part 17 provided on the movable frame 11; the rolling support mechanism arrangement part 28 provided on the fixed frame 22; and the elastic member 31 which connects the movable frame 11 and the fixed frame 22. The rolling support mechanism fixation part 17 is a projection part projecting from the four corners of the movable frame 11, and the rolling support mechanism arrangement part 28 is a recessed part formed at the four corners of the fixed frame 22.

In the present embodiment, an interval between the two sets of the rolling support mechanisms 30 facing each other in the X-axis direction (the first direction) with the rolling drive mechanism 40 being interposed therebetween is smaller than an interval between the two sets of the rolling support mechanisms 30 facing each other in the Y-axis direction (the second direction). As described above, as the rolling drive mechanisms 40 are arranged on the sides (the +Y direction and the −Y direction) at which the interval between the rolling support mechanisms 30 is smaller, a dimension of the unit 100 with shake correction function in the X-axis direction (the first direction) can be made small, and thinning in the X-axis direction can be achieved.

That is, in the movable frame 11, the rolling support mechanism fixation parts 17 at the four places are arranged such that, among the rolling support mechanism fixation parts 17 provided at a plurality of locations in the circumferential direction with the optical axis at the center, the interval between the rolling support mechanism fixation parts 17 at the two places where they face each other in the Y-axis direction (the second direction) orthogonal to the X-axis direction becomes greater than the interval between the rolling support mechanism fixation parts 17 at the two places where they face each other in the X-axis direction (the first direction). Further, the rolling drive mechanism fixation parts 16 are provided at locations where they face each other in the Y-axis direction (the second direction) with the optical axis L being interposed therebetween. As described above, as the rolling drive mechanism fixation parts 16 are arranged in the +Y direction and the −Y direction, respectively, corresponding to the sides at which the interval between the rolling support mechanism fixation parts 17 is smaller, the size of the movable frame 11 in the X-axis direction (the first direction) can be made small.

Figure 9:
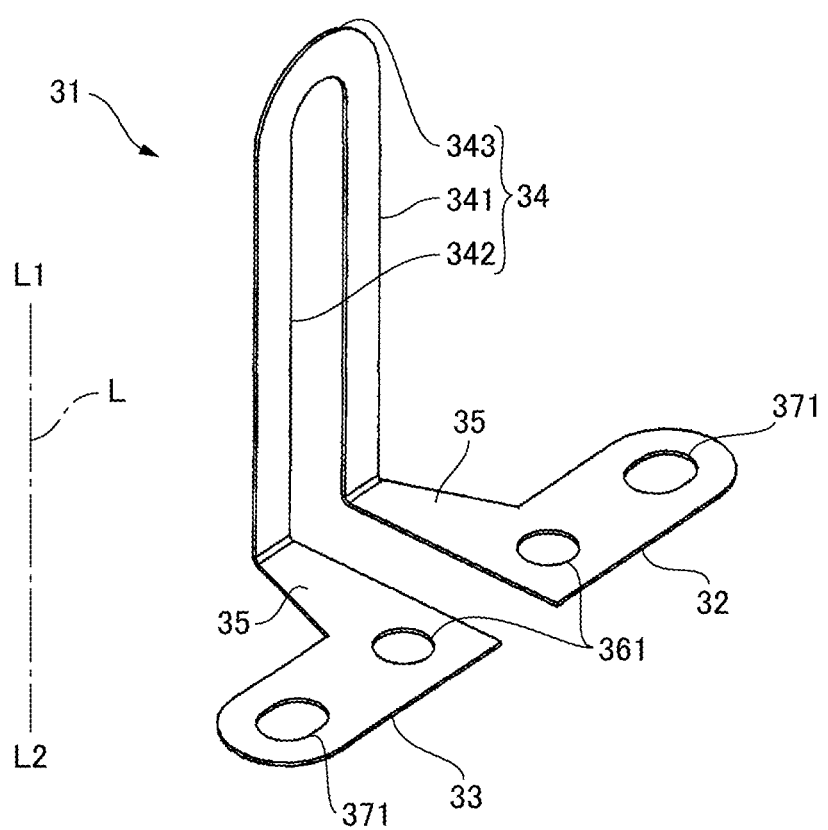
FIG. 9 is a perspective view of an elastic member.

FIG. 9 is a perspective view of the elastic member 31. The elastic member 31 is formed as a plate spring by bending a plate material. As shown in FIG. 9, the elastic member 31 has the shape that an end portion of a U-shaped plate spring, which extends in the optical axis L direction, is bent in a direction orthogonal to the optical axis L, and includes one end portion 32, an other end portion 33, a first elastic portion 34, and a second elastic portion 35. The first elastic portion 34 extends in the optical axis L direction, and the second elastic portion 35 extends in the direction orthogonal to the optical axis L.

The first elastic portion 34 includes a first portion 341 and a second portion 342 extending in parallel along the optical axis L direction, and a semicircular curved portion 343 connecting the first portion 341 and the second portion 342. The first portion 341, the second portion 342, and the curved portion 343 are of a flat plate shape, and located on the same plane. In the first portion 341 and the second portion 342, the sides opposite to the sides connected to the curved portion 343 are connected to the second elastic portions 35 extending in the direction orthogonal to the optical axis L direction, respectively. The second elastic portion 35 that is connected to the first portion 341 is connected to the one end portion 32, and the second elastic portion 35 that is connected to the second portion 342 is connected to the other end portion 33. The one end portion 32 and the other end portion 33 extend in a width direction of the second elastic portions 35, and extend in opposite directions from end portions of the second elastic portions 35, respectively. Each of the second elastic portions 35 has the shape that the width is enlarged toward the side of the one end portion 32 and the other end portion 33, and has the shape that the strength of a portion connected with the one end portion 32 and the other end portion 33 is increased.

The elastic member 31 is arranged in a posture in which the curved portion 343 projects toward the subject side L1. As shown in FIGS. 7 and 8, one of the one end portion 32 and the other end portion 33 is fixed to the movable frame 11, and the other one is fixed to the fixed frame 22. As shown in FIGS. 8 and 9, in each of the one end portion 32 and the other end portion 33, holes are formed at two places separated from each other in a plate surface direction of the first elastic portion 34 (in other words, at two places separated from each other in a direction orthogonal to a direction in which the first elastic portion 34 becomes elastically deformed). One of the holes is a circular positioning hole 361 and the other hole is an elongate hole 371. On each of the fixed frame 22 and the movable frame 11, a positioning portion 362 and a rotation restricting portion 372 are formed. The positioning portion 362 and the rotation restricting portion 372 are both projection parts.

In assembling the fixed frame 22 and the movable frame 11, the elastic member 31 is first fixed to the movable frame 11, and then the movable frame 11 is inserted into the fixed frame 22 to have the elastic member 31 fixed to the fixed frame 22. In fixing the elastic member 31 to the movable frame 11, the positioning portion 362 of the movable frame 11 is inserted into the positioning hole 361 provided in either of the one end portion 32 and the other end portion 33 and is welded. Next, the rotation restricting portion 372 of the movable frame 11 is inserted into the elongate hole 371 and is welded. The work of fixing the elastic member 31 to the movable frame 11 is thereby completed. Next, the movable frame 11 is inserted into the fixed frame 22, the positioning portion 362 of the fixed frame 22 is inserted into the positioning hole 361 of the elastic member 31 and is welded, and the rotation restricting portion 372 of the fixed frame 22 is inserted into the elongate hole 371 and is welded. The work of fixing the elastic member 31 to the fixed frame 22 is thereby completed, and the movable frame 11 is held on fixed frame 22 via the elastic member 31. By virtue of such a structure, the fixed frame 22, the movable frame 11, and the elastic member 31 can be assembled in a state where no load is exerted on the elastic member 31. Accordingly, the assembling work is facilitated, and the assembling performance is improved. Also, the positional accuracy of the movable frame 11 with respect to the fixed frame 22 can be enhanced.

As shown in FIGS. 7 and 8, the one end portion 32 and the other end portion 33 are arranged on both sides of a gap between an inner surface of the rolling support mechanism arrangement part 28 provided on the fixed frame 22 and an outer surface of the rolling support mechanism fixation part 17 provided on the movable frame 11. Each of the second elastic portions 35 extends in a direction intersecting the radial direction from the one end portion 32 and the other end portion 33, and a plate thickness direction of the second elastic portion 35 is oriented in the optical axis L direction. One of the two second elastic portions 35 connected to the one end portion 32 and the other end portion 33 extends to a position overlapping with a groove part 171, which is formed on the outer surface of the rolling support mechanism fixation part 17, in the optical axis L direction, and displacement in the optical axis L direction is not restricted. Accordingly, at least the second elastic portion 35 which overlaps with the groove part 171 in the optical axis L direction can be elastically deformed in the optical axis L direction, and an elastic force can be generated in the optical axis L direction.

The second elastic portion 35 can suppress buckling of the first elastic portion 34 extending in the optical axis L direction when impact, which causes the movable frame 11 to move relatively to the fixed frame 22 in the optical axis L direction by a drop or the like, is applied, and can suppress unintended plastic deformation of the first elastic portion 34. Further, when the movable frame 11 is displaced from the fixed frame 22 in the optical axis L direction, the movable frame 11 can be returned to the original position by the elastic force of the second elastic portion 35.

In the first elastic portion 34, one of the first portion 341 and the second portion 342 is arranged at a groove part 281 formed on the inner surface of the rolling support mechanism arrangement part 28, and the other one is arranged at the groove part 171 formed on the outer surface of the rolling support mechanism fixation part 17. A plate thickness direction of the first elastic portion 34 is oriented in the circumferential direction. The groove parts 281 and 171 have a predetermined width in the circumferential direction, and when the movable frame 11 is rotated about the optical axis L relative to the fixed frame 22, elastic deformations of the first portion 341 and the second portion 342 of the first elastic portion 34 to the opposite sides in the circumferential direction are not restricted. Therefore, the first elastic portion 34 can generate an elastic force in a direction about the optical axis L.

The elastic member 31 can cause the movable frame 11 to return to the original position by means of the elastic force of the first elastic portion 34 when the movable frame 11 is rotated about the optical axis L relative to the fixed frame 22 by inertial force or impact or the like. Further, since the first elastic portion 34 includes the first portion 341 and the second portion 342, the amount of deformation of the first portion 341 and the second portion 342 can be reduced to half the amount of rotation of the movable frame 11 relative to the fixed frame 22. Thus, since a load to be applied to the first elastic portion 34 can be reduced, durability against the impact can be increased, and the buckling of the first elastic portion 34 can be suppressed.

In the present embodiment, as described above, the elastic members 31 are arranged at two places where they face each other in the first axis R1 direction with the optical axis L being interposed therebetween, and at two places where they face each other in the second axis R2 direction with the optical axis L being interposed therebetween, i.e., at a total of four places. As regards the elastic members 31 at the two places where they face each other in the first axis R1 direction with the optical axis L being interposed therebetween, the first elastic portion 34 generates an elastic force in the second axis R2 direction. Meanwhile, as regards the elastic members 31 at the two places where they face each other in the second axis R2 direction with the optical axis L being interposed therebetween, the first elastic portion 34 generates an elastic force in the first axis R1 direction. Consequently, the elastic members 31 at the four places can generate elastic forces in the direction about the optical axis L as a whole.

Stopper Portion

As shown in FIGS. 5 and 6, the rolling support mechanism fixation part 17 provided on the movable frame 11 includes projection parts 172 and 173 that are formed on both sides of the groove part 171 in the circumferential direction. Side surfaces on the radially outer side of the projection parts 172 and 173 serve as first restricted portions 174 (see FIG. 6) which are separated in the circumferential direction by the groove part 171. Further, side surfaces on both sides in the circumferential direction of the rolling support mechanism fixation part 17 serve as second restricted portions 175 and 176 facing the opposite sides in the circumferential direction (see FIGS. 4, 6, and 8). As shown in FIG. 6, the second restricted portion 175 is a side surface of the projection part 172. Meanwhile, the second restricted portion 176 is the movable-body-side stopper portion provided on the rolling drive mechanism fixation part 16. As shown in FIGS. 4 and 7, the second restricted portions 176 are side surfaces extending in the Y-axis direction on both sides in the circumferential direction of the magnet fixing surface 161 of the rolling drive mechanism fixation part 16.

In the fixed frame 22, on the inner surface of the rolling support mechanism arrangement part 28, a first restricting portion 284 which faces the first restricted portion 174 in the radial direction, and second restricting portions 285 and 286 which face the second restricted portions 175 and 176 in the circumferential direction are provided. The first restricted portion 174 and the first restricting portion 284 are arcuate curved surfaces with the optical axis L at the center, and constitute a first stopper portion which restricts displacement of the movable frame 11 relative to the fixed frame 22 in the first axis R1 direction and the second axis R2 direction. Further, the second restricted portions 175 and 176 and the second restricting portions 285 and 286 constitute a second stopper portion which restricts displacement of the movable frame 11 relative to the fixed frame 22 in the direction about the optical axis L. The second restricting portion 286 is the fixed-body-side stopper portion provided on the coil fixation part 27. As shown in FIGS. 7 and 8, the second restricting portions 286 are side surfaces extending in the Y-axis direction on both sides in the circumferential direction of the coil fixation part 27.

The projection part 172 of the rolling support mechanism fixation part 17 is provided with a third restricted portion 177 (see FIG. 3), which is an end surface facing one side (subject side L1) of the optical axis L direction, and a third restricted portion 178 (see FIG. 4), which is an end surface facing the other side (image side L2) of the optical axis L direction. As shown in FIGS. 3 and 4, the fixed frame 22 is provided with a third restricting portion 287 which projects from an end portion on the image side L2 of the inner surface of the rolling support mechanism arrangement part 28 toward an inner peripheral side. The projection part 172 overlaps with the front plate 21 and the third restricting portion 287 when viewed from the optical axis L direction, the third restricted portion 177 and the front plate 21 face each other in the optical axis L direction, and the third restricted portion 178 and the third restricting portion 287 face each other in the optical axis L direction. Therefore, the front plate 21, the third restricting portion 287, and the third restricted portions 177 and 178 constitute a third stopper portion which restricts displacement of the movable frame 11 relative to the fixed frame 22 in the optical axis L direction.

Main Advantages of Present Embodiment

As described above, the unit 100 with shake correction function according to the present embodiment is provided with the rolling drive mechanism 40 and the rolling support mechanism 30, and is capable of rotating the movable body 10 which can hold the optical module 1 about the optical axis L. Thus, since shake correction in a rolling direction can be performed, disturbance in an image captured by the optical module 1 can be suppressed. Also, since the driving magnet 41 and the driving coil 42 which constitute the rolling drive mechanism 40 are arranged on the outer side of the radial direction relative to the disposition space 2 for the optical module 1, there is no need to arrange the disposition space 2 for the optical module 1 and the rolling drive mechanism 40 to be deviated from each other in the optical axis L direction. Therefore, it is possible to suppress an increase in size in the optical axis L direction resulting from providing the rolling drive mechanism 40. Accordingly, it is possible to make the unit 100 with shake correction function thin in the optical axis L direction. Further, in the rolling drive mechanism 40, since the driving magnet 41 and the driving coil 42 face each other in the optical axis L direction, a magnetic field of the rolling drive mechanism 40 does not easily enter the disposition space for the optical module 1. Consequently, magnetic interference between the movable body 10 and the rolling drive mechanism 40 can be suppressed.

In the present embodiment, the rolling drive mechanism 40 overlaps the movable body 10 when viewed from the radial direction. Further, the rolling support mechanism 30 overlaps the movable body 10 and the rolling drive mechanism 40 when viewed from the radial direction. With such a structure, it is possible to suppress an increase in size in the optical axis L direction resulting from providing the rolling drive mechanism 40, and an increase in size in the optical axis L direction resulting from providing the rolling support mechanism 30. Therefore, it is possible to make the unit 100 with shake correction function thin in the optical axis L direction.

In the present embodiment, while the optical module 1 is provided with a magnetic drive mechanism formed of the magnet 4 and the coil 5, the center G1 of the magnet 4 within the optical module 1 in the optical axis L direction and the center G0 of the driving magnet 41 in the optical axis L direction overlap one another when viewed from the radial direction. In this way, if the positions of the driving magnet 41 and the magnet 4 within the optical module 1 in the optical axis L direction are set to be the same, the direction of a magnetic flux emitted from the driving magnet 41 becomes that which is orthogonal to a direction from the driving magnet 41 toward the magnet 4 within the optical module 1. Accordingly, since the magnetic flux emitted from the driving magnet 41 is less likely to reach the magnet 4 within the optical module 1, magnetic interference between the rolling drive mechanism 40 and the optical module 1 can be suppressed. Even if the optical module 1 does not include the magnet 4 therein, in a case where a component which can be affected by a magnetic field is arranged within the optical module 1, magnetic interference that occurs with the component can be suppressed.

The movable body 10 of the present embodiment is provided with the rolling drive mechanism fixation part 16 on which the driving magnet 41 is arranged, and the rolling drive mechanism fixation part 16 is provided with the second restricted portion 176 corresponding to the movable-body-side stopper portion. Further, the fixed body 20 is provided with the coil fixation part 27 on which the driving coil 42 is arranged, and the coil fixation part 27 is provided with the second restricting portion 286 corresponding to the fixed-body-side stopper portion. As described above, by providing each of the movable-body-side stopper portion and the fixed-body-side stopper portion at a region where the rolling drive mechanism 40 is fixed, thereby structuring a stopper mechanism which makes abutment about the optical axis L, it is possible to prevent the number of components from increasing as compared to a case where a stopper member is provided separately. Consequently, it is possible to simplify the structures of the movable body 10 and the fixed body 20.

In the present embodiment, the driving coil 42 is arranged on the fixed body 20, and the driving magnet 41 is arranged on the movable body 10. Therefore, since there is no need to provide a wiring member for supplying power to the driving coil 42 on the movable body 10, a space for allowing the wiring member to move does not need to be secured, and wiring is facilitated. Also, since a stress is not applied to the wiring member during operation of the movable body 10, it is possible to prevent a decrease in the accuracy of shake correction due to the stress, and the rolling correction can be performed with high accuracy. Moreover, no control or electric power is required to prevent the decrease in the accuracy of the shake correction.

Note that the present invention can be applied to a configuration in which the driving coil 42 is arranged on the movable body 10 and the driving magnet 41 is arranged on the fixed body 20.

In the present embodiment, the rolling drive mechanism 40 is arranged at two places on the opposite sides with the optical axis L being interposed therebetween. Therefore, as compared to a case where the rolling drive mechanism 40 is provided at only one place, it is possible to prevent the center of gravity of the movable body 10 from deviating. Consequently, it is possible to suppress a decrease in the accuracy of the shake correction caused by the deviation of the center of gravity, and the rolling correction can be performed with high accuracy. Also, there is no need to provide a counterweight for suppressing the deviation of the center of gravity. Further, by virtue of providing multiple rolling drive mechanisms 40, it is possible to perform the shake correction at a large torque. Note that the number of rolling drive mechanisms 40 is not limited to two, and may be three or more. For example, the above may be provided at four places at equal angular intervals.

In the present embodiment, the rolling support mechanism 30 is provided at a plurality of locations in the circumferential direction with the optical axis L at the center, and the plurality of locations include locations where they face each other in the X-axis direction (the first direction) orthogonal to the optical axis L direction, and locations where they face each other in the Y-axis direction (the second direction) orthogonal to the optical axis L direction and the X-axis direction. Further, an interval between the rolling support mechanisms 30 facing each other in the X-axis direction (the first direction) is smaller than an interval between the rolling support mechanisms 30 facing each other in the Y-axis direction (the second direction), and the rolling drive mechanisms 40 are provided at locations where they face each other in the Y-axis direction (the second direction) with the optical axis L being interposed therebetween. By structuring as above, the size in the X-axis direction (the first direction) is not increased by the providing of the rolling drive mechanisms 40. Consequently, the size of the unit 100 with shake correction function can be reduced in the X-axis direction (the first direction) orthogonal to the direction in which the rolling drive mechanisms 40 face each other. Therefore, in addition to achieving the thinning in the optical axis L direction, downsizing in the X-axis direction can be achieved.

In the present embodiment, preferably, the fixed body 20 should include: the fixed frame 22, which is provided with the wiring recessed part 29 recessed in the optical axis L direction; and the flexible printed circuit board 50 connected to the driving coil 42, and the wiring recessed part 29 should be shaped such that a distance between the Hall element 60, which is mounted on the flexible printed circuit board 50 arranged in the wiring recessed part 29, and the driving magnet 41 is set to a predetermined distance. By structuring as above, it is possible to prevent the flexible printed circuit board 50 from protruding from the fixed frame 22 in the optical axis L direction. Therefore, it is possible to make the unit 100 with shake correction function thin in the optical axis L direction. Further, since the Hall element 60 can be positioned by arranging the flexible printed circuit board 50 in the wiring recessed part 29, positioning of the Hall element 60 is facilitated.

The invention claimed is:

1. A unit with shake correction function comprising:
   a movable body, provided with a disposition space for an optical module;
   a fixed body;
   a rolling support mechanism, configured to support the movable body to be rotatable about an optical axis of the optical module relative to the fixed body; and
   a rolling drive mechanism, configured to revolve the movable body about the optical axis,
   wherein the rolling drive mechanism comprises:
     a driving coil, mounted on one of the movable body and the fixed body; and
     a driving magnet, mounted on the other of the movable body and the fixed body; and
   wherein the driving coil and the driving magnet face each other in a direction of the optical axis, and are arranged on an outer side of a radial direction with the optical axis at a center, relative to the disposition space;
   wherein the rolling drive mechanism overlaps the movable body when viewed from the radial direction;
   wherein
   the optical module comprises a magnet and a coil; and
   a center of the magnet in the direction of the optical axis and a center of the driving magnet in the direction of the optical axis overlap one another when viewed from the radial direction.

2. The unit with shake correction function according to claim 1, wherein
   the rolling support mechanism overlaps the rolling drive mechanism when viewed from the radial direction.

3. The unit with shake correction function according to claim 1, wherein
   the movable body comprises a rolling drive mechanism fixation part to which the driving magnet or the driving coil is arranged; and
   the rolling drive mechanism fixation part comprises a movable-body-side stopper portion which makes abutment with a fixed-body-side stopper portion provided on the fixed body in a direction about the optical axis.

4. The unit with shake correction function according to claim 1, wherein
   the driving coil is arranged on the fixed body; and
   the driving magnet is arranged on the movable body.

5. The unit with shake correction function according to claim 1, wherein
   the rolling drive mechanism is arranged at a plurality of locations including two places on opposite sides with the optical axis being interposed therebetween.

6. The unit with shake correction function according to claim 5, wherein
   the rolling support mechanism is provided at a plurality of locations in a circumferential direction with the optical axis at the center;
   wherein the plurality of locations include:
     locations facing each other in a first direction orthogonal to the direction of the optical axis, and
     locations facing each other in a second direction orthogonal to the direction of the optical axis and the first direction;
   wherein an interval between the rolling support mechanisms which face each other in the first direction is smaller than an interval between the rolling support mechanisms which face each other in the second direction; and
   the rolling drive mechanism is provided at locations facing each other in the second direction with the optical axis being interposed therebetween.

7. The unit with shake correction function according to claim 1, wherein the fixed body comprises:
   a fixed frame which is provided with a wiring recessed part recessed in the direction of the optical axis; and
   a flexible printed circuit board connected to the driving coil,
   wherein the wiring recessed part is shaped such that a distance between a Hall element, which is mounted on the flexible printed circuit board arranged in the wiring recessed part, and the driving magnet is set to a predetermined distance.

* * * * *